(12) United States Patent
Miller

(10) Patent No.: US 9,021,736 B2
(45) Date of Patent: May 5, 2015

(54) FISHING LINE FLOAT AND SPOOL DEVICE

(71) Applicant: Henry Miller, Oklahoma City, OK (US)

(72) Inventor: Henry Miller, Oklahoma City, OK (US)

( * ) Notice: Subject to any disclaimer, the term of this patent is extended or adjusted under 35 U.S.C. 154(b) by 147 days.

(21) Appl. No.: 13/861,536

(22) Filed: Apr. 12, 2013

(65) Prior Publication Data

US 2013/0298440 A1     Nov. 14, 2013

Related U.S. Application Data

(60) Provisional application No. 61/645,690, filed on May 11, 2012.

(51) Int. Cl.
| | |
|---|---|
| *A01K 89/08* | (2006.01) |
| *A01K 93/00* | (2006.01) |
| *A01K 93/02* | (2006.01) |
| *A01K 97/12* | (2006.01) |
| *A01K 89/00* | (2006.01) |

(52) U.S. Cl.
CPC .................. *A01K 93/02* (2013.01); *A01K 93/00* (2013.01); *A01K 97/12* (2013.01); *A01K 89/08* (2013.01); *A01K 89/00* (2013.01)

(58) Field of Classification Search
USPC .................................... 43/4, 15, 16, 17, 43.11
See application file for complete search history.

(56) References Cited

U.S. PATENT DOCUMENTS

| | | | | |
|---|---|---|---|---|
| 2,041,322 | A * | 5/1936 | Cantini | 43/43.11 |
| 2,738,609 | A | 3/1952 | Reed | |
| 2,915,847 | A * | 12/1959 | Hancock | 43/43.11 |
| 3,714,731 | A * | 2/1973 | Benson | 43/43.11 |
| 4,010,567 | A | 3/1977 | MacMillan | |
| 4,291,484 | A | 9/1981 | Young | |
| 4,506,471 | A | 3/1985 | Riead | |
| 4,542,862 | A * | 9/1985 | Romike et al. | 242/405.1 |
| 4,831,762 | A * | 5/1989 | Harris | 43/17 |
| 4,934,090 | A * | 6/1990 | Storey et al. | 43/17 |
| 5,253,445 | A * | 10/1993 | Spoonemore | 43/17 |
| 5,265,369 | A * | 11/1993 | Botkins | 43/43.11 |
| 5,852,894 | A | 12/1998 | Shannon et al. | |
| 6,029,391 | A * | 2/2000 | Holley et al. | 43/43.11 |
| 6,401,382 | B2 * | 6/2002 | Larkin | 43/43.11 |
| 6,467,214 | B1 | 10/2002 | DeFrisco | |
| 6,796,076 | B1 * | 9/2004 | Bennett | 43/16 |
| 6,854,207 | B1 * | 2/2005 | Strope | 43/4 |
| D510,975 | S * | 10/2005 | Denton | D22/137 |
| 8,739,458 | B1 * | 6/2014 | Michael | 43/15 |

* cited by examiner

*Primary Examiner* — David Parsley
(74) *Attorney, Agent, or Firm* — Robert H. Frantz

(57) ABSTRACT

A fishing line float and spool device is provided having a rounded, buoyant structure, and an arraignment that allows a length of fishing line to be independently supported from the water surface. The device comprises a first and second side having a perimeter flange and an inset channel therebetween for supporting the fishing line about the perimeter of the device. A plurality of notches is disposed through the flanges of each of the float sides. The fishing line attaches around the float and is extended therefrom, whereby the notches allow the line to be tied off such that when the line is struck by a fish the float flips over for notification purposes. The center of the float includes an aperture therethrough for assisting the user when tying off the fishing line, while also providing a support for an external hand crank reel or a lighted pole.

13 Claims, 6 Drawing Sheets

FISHING LINE FLOAT AND SPOOL DEVICE

CROSS REFERENCE TO RELATED APPLICATION

This application claims the benefit of U.S. Provisional Application No. 61/645,690 filed on May 11, 2012, entitled "Catfish Donut." The above identified patent application is herein incorporated by reference in its entirety to provide continuity of disclosure.

BACKGROUND OF THE INVENTION

1. Field of the Invention

The present invention relates to angling equipment and bottom fishing. More specifically, the present invention pertains to a baited line flotation device that supports a suspended, vertical fishing line from the water surface for snaring catfish and other bottom-dwelling fish.

Most anglers attempting to snare catfish and other bottom-dwelling fish utilize a rod and reel, whereby the angler tends an extended line that is positioned along the bottom of the water using a line weight. Attending to the rod and reel requires vigilance, whereby the angler generally remains outside and in the elements while casting and observing the deployed fishing line. This process can be an enjoyable recreational activity for some, but for others the process can be tiresome and inefficient, particularly for anglers attempting to catch as many fish as possible in a given outing.

The present invention provides a flotation device for bottom fishing, wherein a suspended, vertical fishing line is supported along the water surface and a weighted bait is positioned along the floor of the body of water. The device allows fisherman and anglers to position several independent fishing line floats along the surface of a body of water, wherein the floats can be left unattended and monitored from afar for strikes on the individual lines.

The present invention introduces several key features that facilitate "hands-off" fishing, allowing the fisherman to monitor several different lines at once while not remaining in the immediate location of each deployed line. The floats include a structure that allows for ready deployment of a given length of fishing line, while the arrangement of its connection with the float makes the float flip over from one side to another if the fish strikes the line, providing a readily visible signal to a fisherman that a line has been struck that requires attention.

The use of floats over a rod and reel has other advantages aside from allowing a more hands-off approach. When a line is struck by a larger fish, reeling the fish in can be a physical experience and one that requires skill and endurance to complete. The present invention contemplates a float structure that supports a given length of fishing line, whereupon a strike on the end of the line, the float resists being pulled under water and creates significant resistance on the one end of the line. The fish, upon being struck by the hook, will attempt to flee. The counteraction of the float against any diving motion or motion along the surface of the water will quickly tire the fish to the point of exhaustion. After the fish is exhausted, the fisherman can more readily draw the fish towards the surface for retrieval. This process makes the buoyancy of the float act as the resistive force against the fish, as opposed to physical force required when using a rod and reel.

The overall goal is to provide an angler with an improved method of fishing using an advanced floatation device, while also allowing the angler to engage in other activities without being consumed by an attention to a cast fishing line from a rod and reel. For those fishermen who desire several deployed lines for maximizing the chance of a strike, the present invention provides a deployable fishing means. For those individuals who enjoy recreational fishing activities and other water sports, the present invention provides a means of fishing that allows the angler to engage in other water sports or activities near the water simultaneously and without requiring a single-minded approach to the fishing activity.

2. Description of the Prior Art

Devices have been disclosed in the prior art that relate to bottom fishing and fishing devices. These include devices that have been patented and published in patent application publications, and generally relate to fishing floats and illuminated floats. No devices are disclosed sharing all elements of the present invention. The following is a list of devices deemed most relevant to the present disclosure, which are herein described for the purposes of highlighting and differentiating the unique aspects of the present invention, and further highlighting the drawbacks existing in the prior art.

One such device, U.S. Pat. No. 5,852,894 to Shannon, discloses a flip float having a first and second half and a structure that is meant to flip over when an attached fishing line is struck by a fish. The device comprises a buoyant body having a central tube extending through the body along opposite sides thereof. A weight within the tube shifts from one end thereof to the other, contacting stops at the ends of the tube. The weight is attached to a fishing line, wherein upon a fish striking the line, the weight is transferred from one end of the tube to the other and the device flips over to notify a distance fisherman of the strike. While the Shannon device discloses a flipping float having two sides such that a fisherman can see a struck line from afar, the structure and operation of the Shannon device diverges significantly from the present invention.

Other devices relate to illuminated fishing floats that provide a fisherman with visual location of the fishing line when deployed. Devices of this type include U.S. Pat. No. 4,010,567 to MacMillan, U.S. Pat. No. 4,291,484 to Young, and U.S. Pat. No. 2,738,609 to Reed. These devices disclose novel fishing flotation devices having an illumination means, but fail to disclose a fishing float that rotates over itself upon its attached fishing line being struck by a fish. The present invention provides a new and novel fishing line deployment means, float, light support, and strike notification means, where a fisherman can examine the status of the fishing line from afar.

The present invention provides a new and novel fishing lure float for bottom fishing with an extended lure and weight to keep the lure just above the floor of the body of water. The float provides a spool structure having a series of notches that allow the lure's position to be controlled and the float to flip over upon being struck by a fish. The goal is to provide a float that can tend to a line independently of a user, whereby a plurality of fishing lures can be deployed over a body of water and observed from a distance. It is submitted that the present invention is substantially diverges in design elements from the prior art and consequently it is clear that there is a need in the art for an improvement to existing fishing float devices. In this regard the instant invention substantially fulfills these needs.

SUMMARY OF THE INVENTION

In view of the foregoing disadvantages inherent in the known types of fishing floats now present in the prior art, the present invention provides a new fishing float and spool device that can be utilized for providing convenience for the user when deploying a fishing lure along the bottom of a body of water and utilizing the float to tend to the fishing line, whereby upon a strike the float flips over to provide notification for the user.

It is therefore an object of the present invention to provide a new and improved fishing float device that has all of the advantages of the prior art and none of the disadvantages.

It is another object of the present invention to provide a fishing float device that provides an angler with a means to deploy a weighted fishing line in the water without physically handling the line, whereby the float supports the line and further provides a means to notification for the user when the line is struck by a fish.

Another object of the present invention is to provide a fishing float that acts as a spool of fishing line, wherefrom a length of line can be extended and supported at a given extended length within the water by way of specifically designed notch locations along the float perimeter that support the line when deployed.

Yet another object of the present invention is to provide a fishing float device that can accept an upstanding light pole for supporting a light from the water's surface, whereby the lighted float can provide a fisherman with the location of several other fishing float locations positioned around the lighted float.

Another object of the present invention is to provide a fishing float device that includes a first and second side, whereby the fisherman can determine if a line is struck by viewing which side of the float is upright when deployed.

Another object of the present invention is to provide a fishing float device that doubles as a fishing line spool, whereby a hand crank reel can be inserted into the float center and utilized to rotate the spool when deploying or retrieving an extended fishing line.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
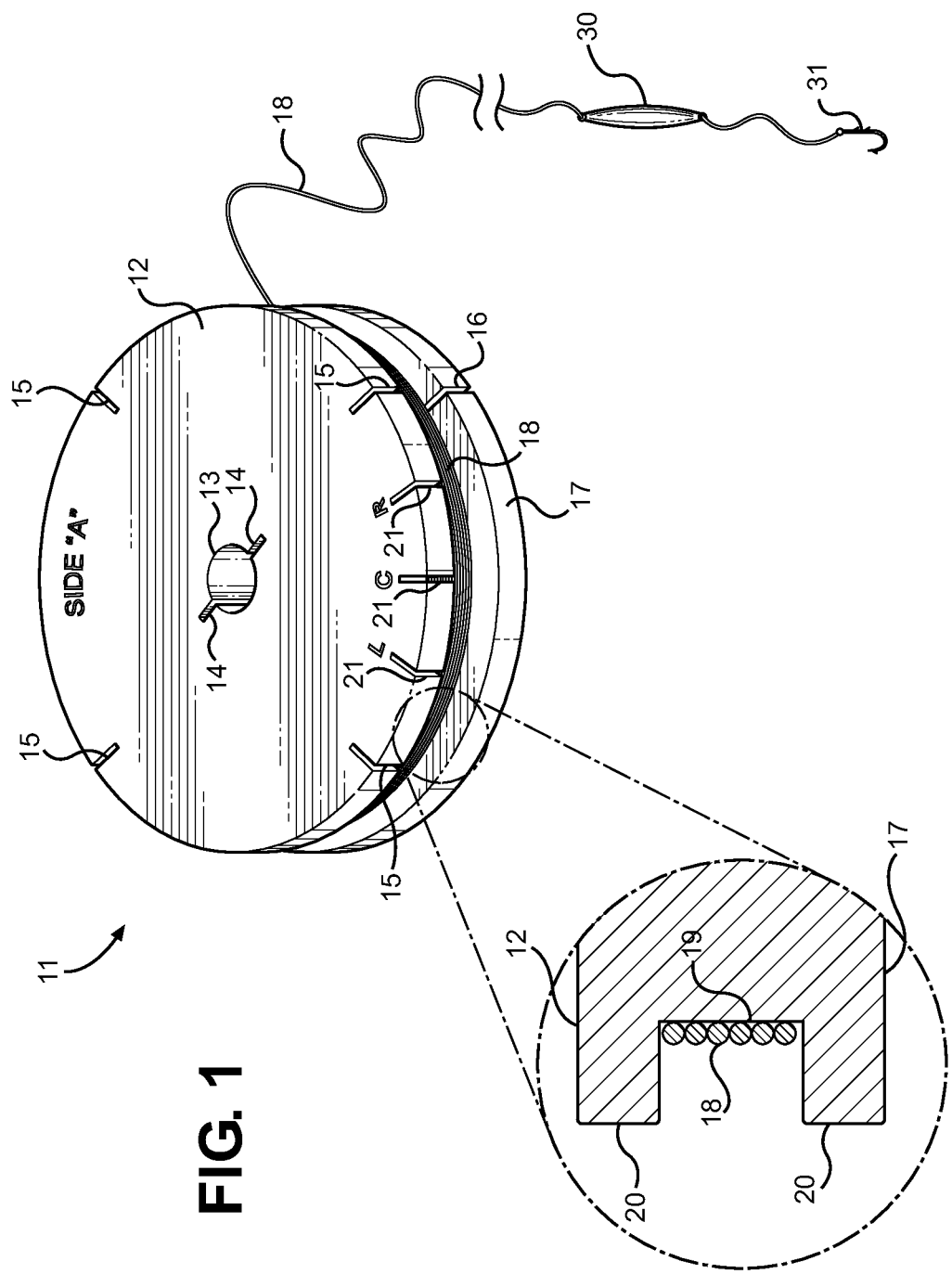
FIG. 1 shows a perspective view of side "A" of the present fishing float.

Reference is made herein to the attached drawings. Like reference numerals are used throughout the drawings to depict like or similar elements of the fishing float device. For the purposes of presenting a brief and clear description of the present invention, the preferred embodiment will be discussed as used for supporting an extended and weighted fishing lure from the water's surface, acting as a fishing line spool, and a notification means for a fisherman that displays a strike on the line by the orientation of the fishing float on the water's surface. The figures are intended for representative purposes only and should not be considered to be limiting in any respect.

Referring now to FIG. 1, there is shown a perspective view of the fishing float 11 of the present invention. The device comprises a rounded flotation structure having a first side 12 and a second side 17 and an inset channel 19. A pair of flanges 20 extend from the perimeter of the rounded float along both sides of the device and bound the inset channel 19, whereby a length of fishing line 18 may be positioned therein and wound around the perimeter of the float such that the device acts as a fishing line spool. Through the center of the device is an aperture 13 that extends through the thickness of the float. Extensions 14 from the center aperture provide a means for positioning an object therethrough for rotating the assembly to deploy or retrieve fishing line 18 by winding the same therearound.

The first side 12 of the device, designated "Side A", provides a set of four notches 15 equidistantly positioned about its perimeter flange 20 such that the fishing line 18 can be slid thereinto when tying off the line. Between two of the notches 15 is a set of line position notches 21 that are utilized as the last notch through which the fishing line 18 is fed through before entering into the water. These position notches 21 provide a labeled means of notification for the angler or fisherman of the status of the fishing line bate. If the fishing line has been struck at one position, the fisherman can retract the line and re-bait the line. After re-baiting, the line 18 can be positioned into a subsequent position notch 21 and deployed into the water. The weight 30 draws the line taught in the water while the float buoyancy maintains the position notch 21 above the water. Switching between position notches 21 provides a reminder for the fisherman as to the status of the line and how many times the line has been baited.

Figure 2:
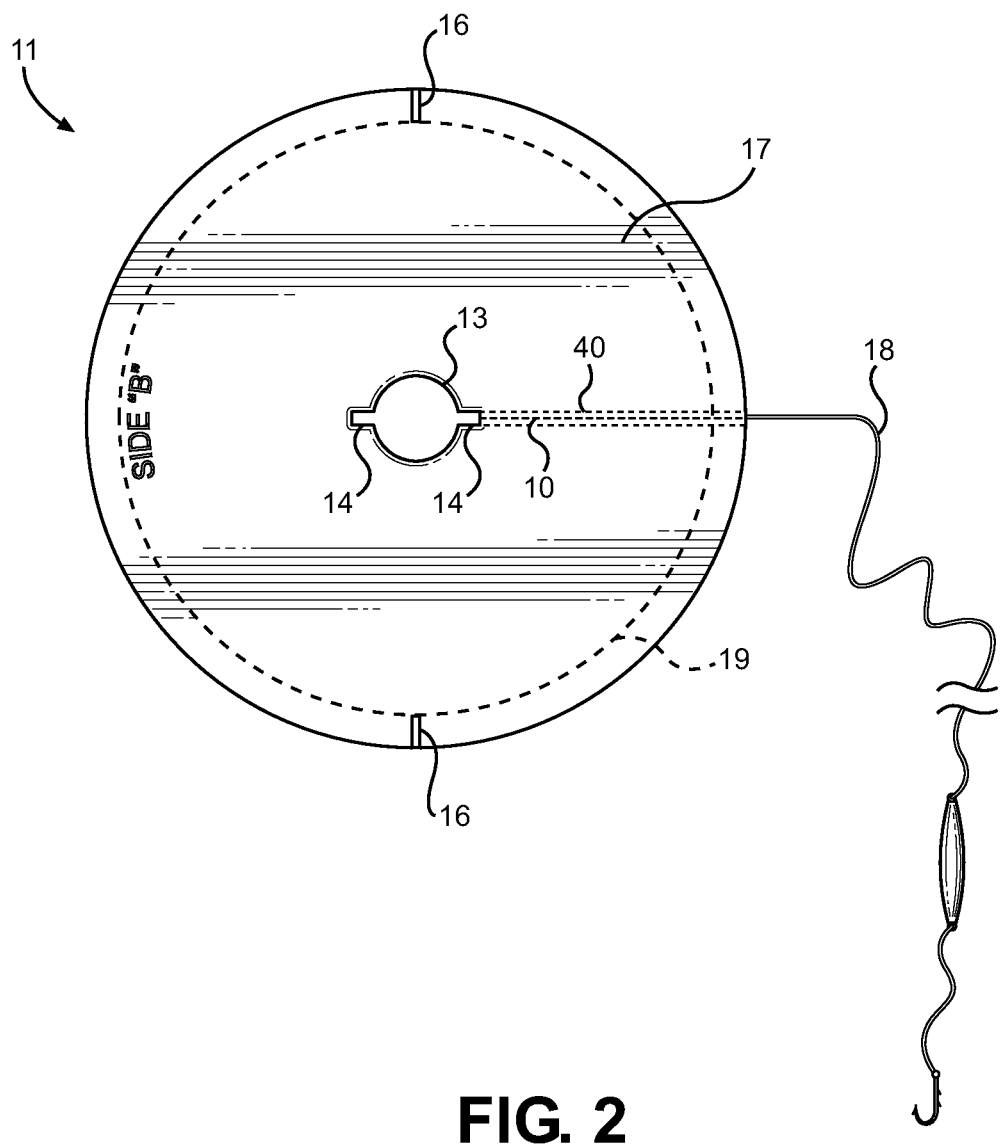
FIG. 2 shows a top view of side "B" of the present fishing float.

Referring now to FIG. 2, there is shown a top view of present fishing float device, wherein the second side 17, designated "Side B" is visualized. This side 17 of the device includes two notches 16 that disposed across from one another along the rounded perimeter of the float. Preferably, these notches 16 are 180 degrees apart and protrude through the flange of the float second side 17 to provide a means of securing the fishing line 18 when deploying the baited line in the water.

The fishing float acts as a flotation device, however it also doubles as a fishing line spool. The fishing line 18 secures within the interior of the device and is routed through a drilled aperture 40 from its center 13 towards its perimeter channel 19. The line 18 is supported by a pin or knot at the interior end of the line 18, which is drawn into the aperture flange 14 as the line is tensioned through the drilled aperture extending from the center aperture to the perimeter channel 19. Once in the channel, the line 18 is wound around the perimeter of the device 11 within the channel 19 interior such that the line can be stored and readily deployed without entanglements.

Figure 3:
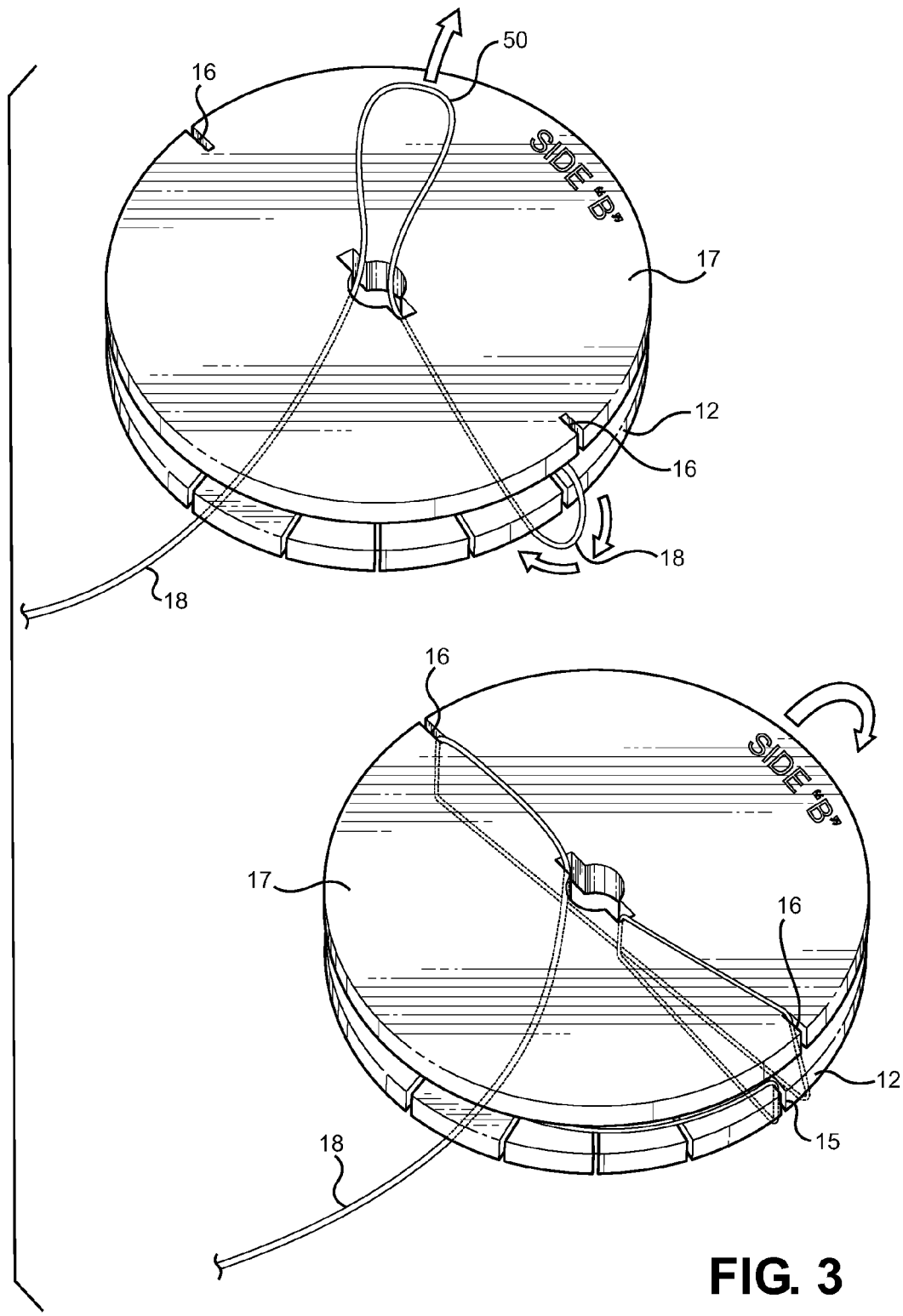
FIG. 3 shows the method in which the fishing float is deployed when tying off a fishing line therefrom.

Referring now to FIG. 3, there is shown a view demonstrating the preferred method of deploying a fishing line from the float such that the float orientation is reactive to a strike on the end of the line. Ideally, the device is deployed with its second side 17 facing downward and its first side facing upwards. The fishing line is fed through the notches of the device such that when the lure is tugged sufficiently, the float flips over such that its first side is then faced downward and its second side 17 is directed upwards. This provides a fisherman with a means of notification that a line has been struck by a fish and that his or her attention is needed. This further allows the fisherman to deploy the float in an area and monitor its status from a distance. Once the line is struck, the fish will attempt to flee, flipping over the float and tiring itself as the buoyancy of the float creates resistance on the fishing line during the movement. Shortly after being snared, the fish becomes tired and ceases its attempts to flee, facilitating retrieval of the fish with minimal physical input or exertion.

As shown in FIG. 3, when deploying the float, a length of fishing line 18 is withdrawn from the float channel in a similar manner as a fishing line spool. When bottom fishing, the line is baited, weighted, and extended such that the bait rests a few feet above the floor of the body of water. The user then grasps the line 18, positions the line into one of the float first side notches 15. The user then creates a loop 50 and feeds the loop 50 through the float center 13 from the float first side 12. The loop 50 is then spread apart and positioned through opposing notches 16 in the float second side. In this position, a tug on the line will act to flip the float body while deployed.

Figure 5:
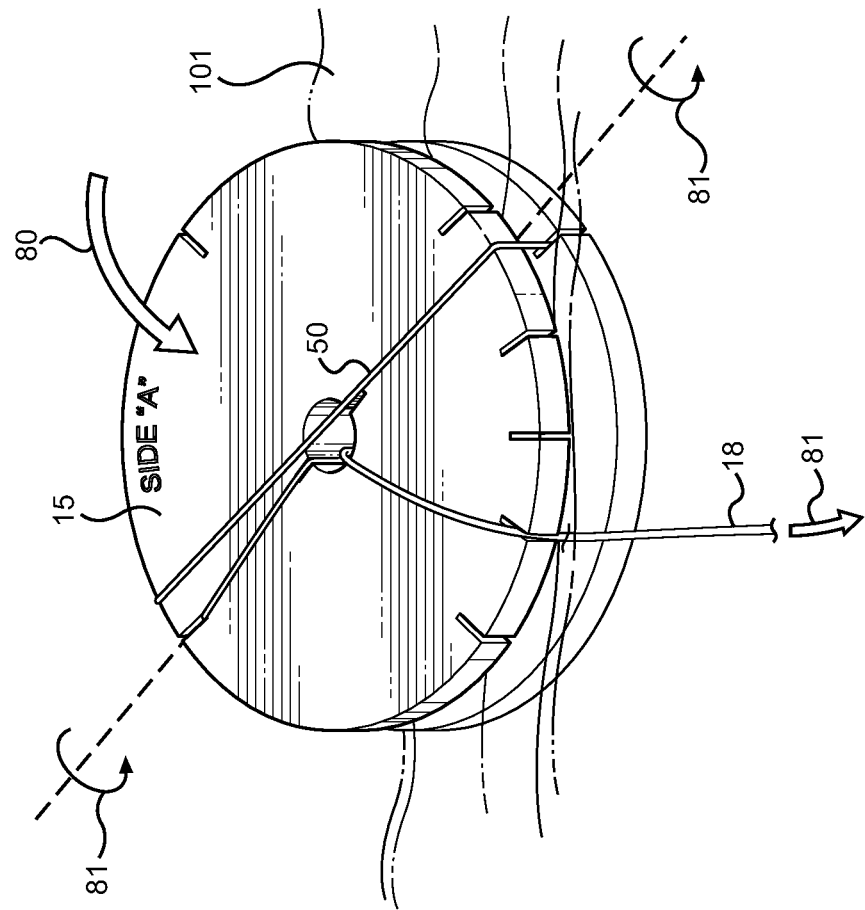
FIG. 5 shows the fishing float in a working position, whereby a strike on the line is flipping over the float to notify a fisherman of the event.
Figure 4:
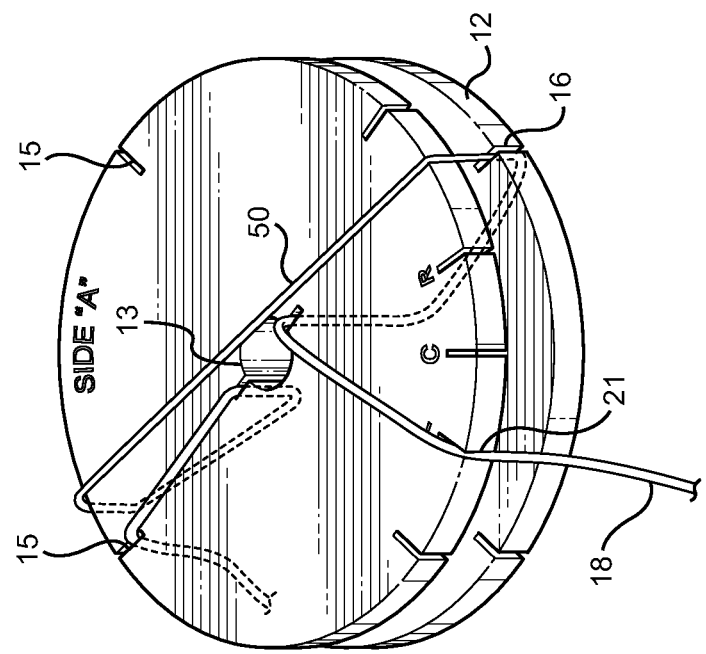
FIG. 4 shows a perspective view of side "A" in a working position, supporting the fishing line within its designed notches such that the assembly will maintain a static lure depth and flip over upon a strike.

As shown in FIGS. 4 and 5, after the line 18 is positioned within the channel the float can be flipped over and the line can be placed into one of the three position notches 21 along the float first side 12. The float can then be placed on the water 101 surface for supporting the weighted lure a few feet above the floor of the body of water. When the lure is tugged 81 sufficiently and struck by a fish, the tension in the line 18 places a lifting moment 80 on the float. The line within half of the channel is drawn toward the float center, lifting the one half from its resting position on the water surface and effectively flipping over the device. The positioning of the various notches along the first 12 and second 17 side allow for the tension in the line to create the flipping moment required to change the float orientation. Ideally the different sides of the float are colored differently such that a fisherman can visualize a "flipped" float from a distance and inspect the line.

Figure 6:
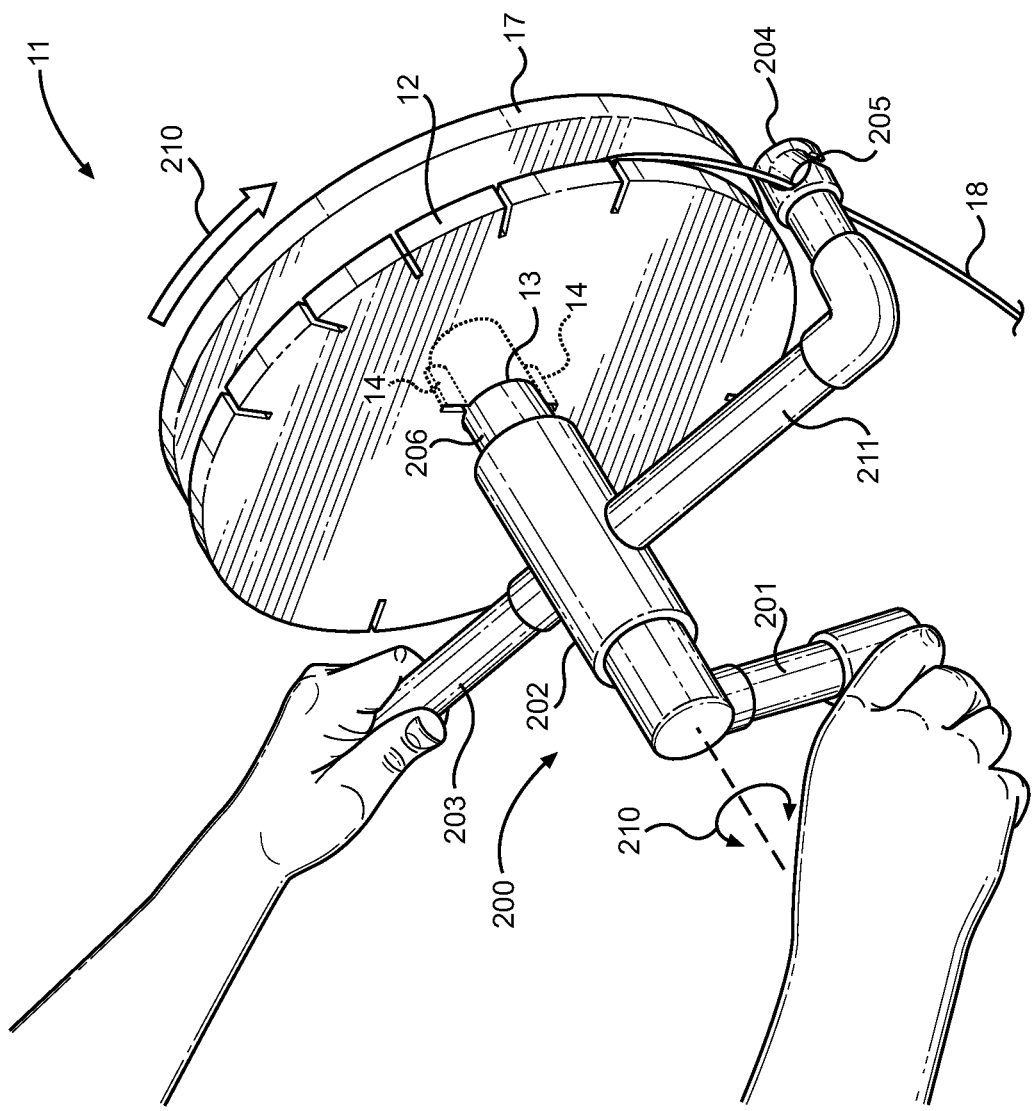
FIG. 6 shows the present invention in conjunction with a hand crank reel device, whereby the float is acting as a fishing spool and deploying a length of fishing line.

Referring now to FIG. 6, there is shown a view of the present float device 11 being supported by an external hand crank reel 200. The reel 200 comprises a structure that secures through the center 13 of the float 11 to allow the user to rotate 210 the float 11 when retrieving or deploying the fishing line 18. The reel 220 comprises a first hand crank 201 that rotatably connects to a reel main body 202. A support arm 203 extends from the main body 202 and allows the user to grasp and maintain the position of the main body 202 while rotating the hand crank 201. Extending from an opposite side of the main body is an extension arm 211 that supports a fishing line guide rail 204 positioned over the float channel 19. The guide rail 204 is a U-shaped support having an open upper portion 205 that accepts and guides the fishing line 18 as it leaves the float spool channel 19, positioning it away from the channel 19.

When retrieving a fishing lure, the reel 200 is utilized as a means to cleanly draw the weight and hook from the water and wind the line around the perimeter channel 19. The user may utilize the reel 200 as a means to draw in a snared fish; however this will be limited by the construction of the buoyant float device 11. The float 11 is preferably comprised of a lightweight, buoyant material such as closed cell foam. In order to operate as an active fish retrieving device, the float 11 may also be comprised of higher strength material such as a hollow plastic or wood material. It is not desired to limit the float to a given material, but rather to disclose a functional float and fishing line spool that may have the capacity to actively reel in a snared fish if so desired in its construction.

When reeling in the line 18, the reel 200 functions as a means to wind the line 18 around the perimeter channel of the float without requiring the user to manually rotate the float 11 or pull on the line 18. The reel includes an insert member 206 that extends into the float center aperture 13 and into the aperture flanges 14. The insert 206 is an extension of the hand crank 201 that is rotatably positioned within the reel main body 202. When retrieving the fishing line 18, the user rotates 210 the hand crank 201, which in turn rotates 210 the float in one direction or another. The line 18 is fed through the guide 204 and drawn around the float perimeter and within its channel 19. Flanges on the reel insert member 206 are positioned within the aperture flanges 14 to prevent slipping along the reel/float aperture interface.

Figure 7:
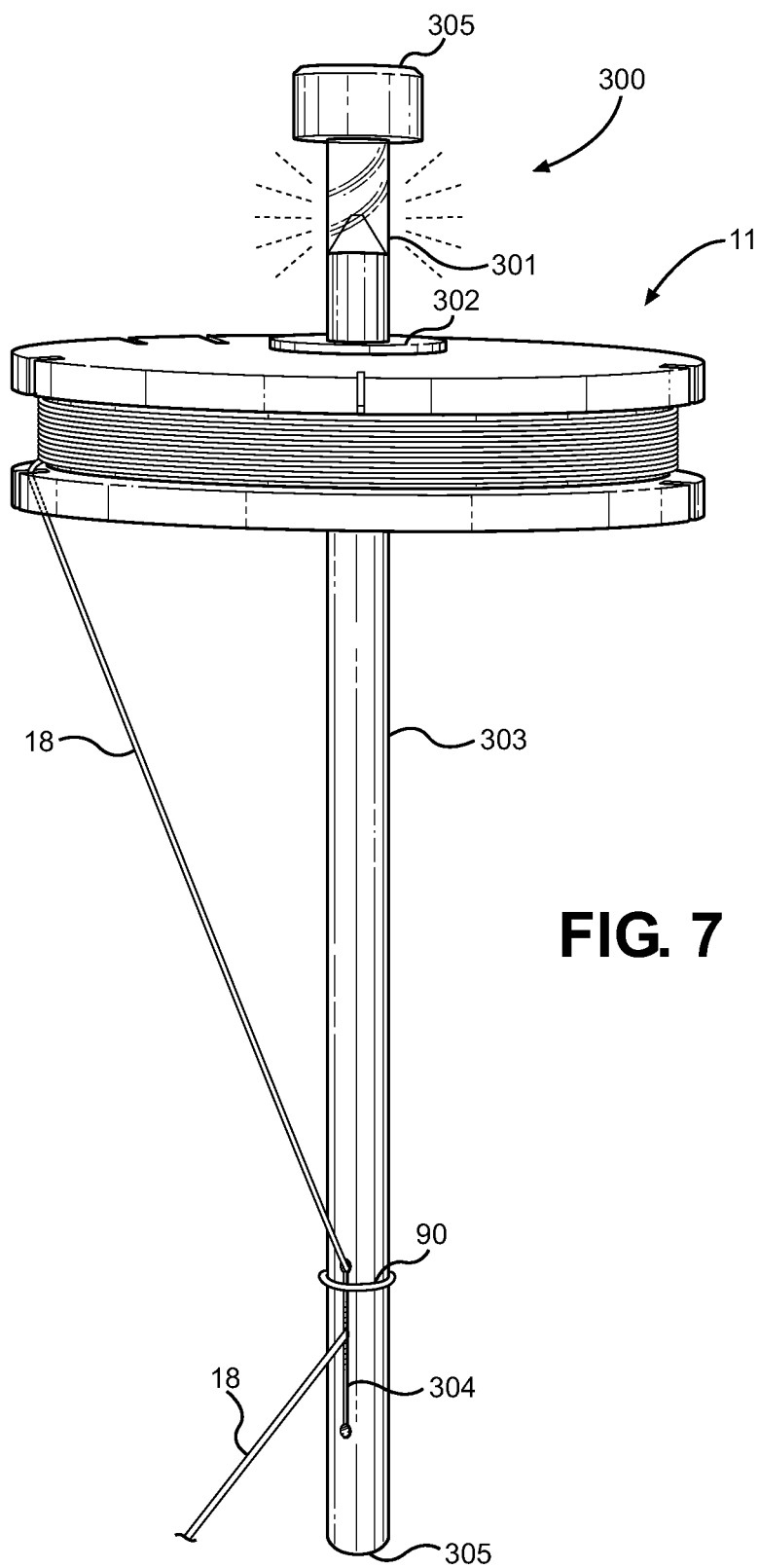
FIG. 7 shows a view of the present fishing float in conjunction with a lighted pole, whereby the float is transformed into a lighted fishing float device.

Referring now to FIG. 7, there is shown a view of the present invention in an alternate configuration, whereby an external light post 300 is positioned through the float center aperture for the purposes of illuminating a given area and notifying a fisherman of the location of the given float in low light environments. When deploying several floats in a given area, a fisherman or angler may wish to highlight the area for further reference, particularly when fishing in low light or at night. The light post 300 comprises an elongated body 303 having a lighted first end 305 and a distal second end 305 adapted to be positioned within the water. The first end 305 includes an illumination means, such as a light bulb and power supply, along with a widened flange 302 that prevents the float 11 from riding too high along the post body 303 and positioning the light 301 too close to the water surface. The float 11 maintains the buoyancy of the device, while the fishing line 18 can be extended from the float 11 and tied off 90 within an aperture 304 in the post along its distal second end 305. When the light post 300 is deployed with the float 11, the device is utilized primarily as a signal means as opposed to an active fishing line. The light source is preferably a solar light that can recharge itself during the daylight hours, but also contemplated is a battery powered light source that includes a replaceable battery power supply.

Fishing for catfish with a rod and reel requires that the fisherman sit in the elements waiting with pole in hand while friends and family may be enjoying themselves elsewhere. Trout lines limit a user to one location, and are time consuming to run. Jug lines take up a lot of room on your boat and are easily tangled. The present invention pertains to a fishing float that is designed to maintaining an active fishing line from the water surface, while also providing a spool structure to support the line within a perimeter channel and a structure that readily changes orientation upon a fish strike on the line. The device is designed to support weighted bait along the bottom of a body of water while the angler or fisherman can leave the area and monitor the device from a distance. When deploying the device, a user places the reel through the float and allows the falling weight within the water to unwind the line from the float spool. When retrieving the line, the user utilizes the hand crank reel to draw the line over the float channel such that the float acts as a fishing line spool. Finally, when deploying several floats at night, the float can support a lighted pole for declaring the position of the deployed floats for a user to retrieve in low light.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing line float and spool device, comprising:
   a rounded, buoyant structure having a first side, a second side, and a perimeter, the first and second sides terminating at a flange at the structure perimeter;
   an inset channel between the first and second side flanges along the structure perimeter for supporting fishing line therein;
   an unobstructed aperture through the structure extending through the first and second sides;
   a plurality of notches formed in at least one of the flanges; and
   a portion of fishing line having a first end secured to said structure, a second end for receiving a fish hook, and a loop between the first and second ends passed through said unobstructed aperture and secured in at least two of the notches.

2. The device of claim 1 wherein the plurality of notches comprise four notches equidistantly disposed around the perimeter.

3. The device of claim 2 wherein the four notches comprise a plurality of fishing line position notches between two of said equidistantly positioned notches.

4. The device of claim 1, wherein said second side comprises two notches oppositely disposed around said perimeter.

5. The device of claim 1, wherein the aperture comprises a circular aperture positioned in a center of the structure.

6. The device of claim 5 wherein the circular aperture further comprises aperture notches extending therefrom.

7. The device of claim 1 further comprising a pathway between the aperture and the inset channel for receiving the fishing line.

8. The device of claim 1 wherein the structure comprises a close cell foam material.

9. The device of claim 1 wherein the structure comprises a hollow plastic material.

10. The device of claim 1 further comprising:
    a hand crank reel having a reel insert member adapted to insert into the aperture; and
    a hand crank for rotating the structure when deploying or retrieving the fishing line from the inset channel.

11. The device of claim 10 wherein the hand crank reel further comprises:
    a reel main body rotatably supporting the hand crank, the reel main body further comprising a first support arm for a user to grip while rotating the hand crank; and
    an extension arm supporting a fishing line guide rail to accept the fishing line from the inset channel when rotating the structure.

12. The device of claim 1 further comprising a light post for inserting into the buoyant structure aperture and providing a light source attached thereto.

13. The device of claim 12 wherein the light post further comprises:
    an elongated body having a lighted first end adapted to be positioned above structure with flange bearing against the structure while deployed;
    a widened flange along said body; and
    a distal second end having an light post aperture for tying the fishing line from the inset channel.

* * * * *